Patented Sept. 16, 1930

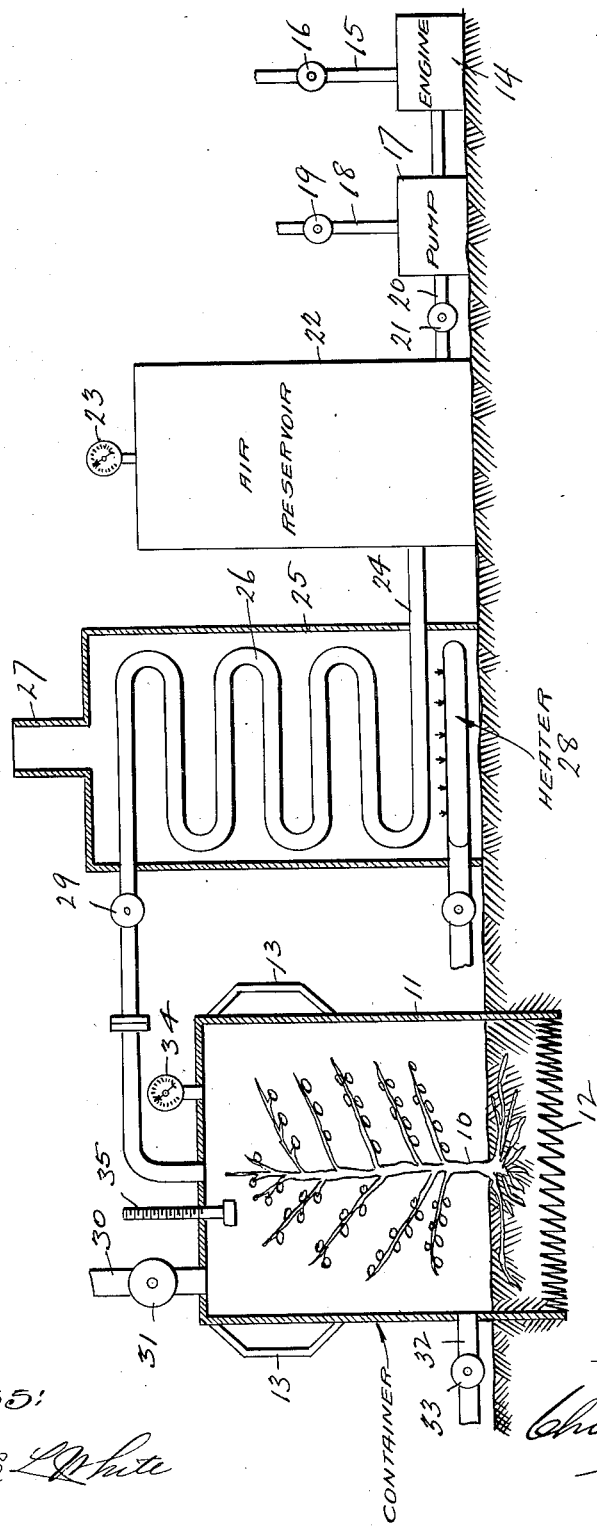

1,775,703

UNITED STATES PATENT OFFICE

CHARLES L. STOKES, OF LOS ANGELES, CALIFORNIA

PROCESS FOR DESTROYING INSECT LIFE ON VEGETATION

Application filed May 19, 1927. Serial No. 192,582.

My invention relates to improvements in processes for destroying insect life on vegetation.

The principal object of my invention is to provide process and apparatus for controlling the spread of the boll weevil on cotton plants.

The boll weevil lays its eggs in the squares and bolls of the cotton plant in large numbers. These eggs yield the larval form which change after a certain period into pupa form which again develops into the adult insect and this cycle is repeated until the numbers of adult insects cause immense damage to the cotton crop.

It is found that heat to certain degrees is fatal to the three forms above mentioned and heat may be applied under varying degrees of pressure on the absolute scale with efficiency. Preferably I apply heat by means of a carrier gas to which may be added various chemical insecticides, preferably also in gaseous form, such as carbon disulphide, hydrocyanic acid, carbon dioxide, carbon monoxide and the like.

In the drawing is illustrated a method of applying my process through the medium of suitable apparatus wherein a cotton plant 10 is enclosed by a metallic cylinder 11 having a serrated lower open periphery 12, cylinder 11 being rotatably forced into the soil by handles 13 to form a substantially air-tight envelope for the plant 10 except for the connections hereinafter mentioned.

An engine 14, which may be an internal combustion engine, has a exhaust pipe 15 controlled by a valve 16 and drives a gas pump 17 having an inlet 18 controlled by a valve 19. Pump 17 discharges through a pipe 20, controlled by valve 21, into a reservoir 22 having a pressure gage 23. Gas under a desired pressure passes from reservoir 22 through a pipe 24 into a furnace 25, where it is formed into a coil 26, and passes thence through a control valve 29 into the cylinder 11. Coil 26 may be heated to a desired degree by means of a heater 28, the products of combustion passing through chimney 27 to atmosphere or otherwise. Cylinder 11 is provided with a thermometer 35, a pressure gage 34, an upper blow-off pipe 30, controlled by valve 31, and a lower blow-off pipe 32, controlled by valve 33.

In the application of the process, air is drawn in by pump 17 through pipe 18 and forced under pressure into the reservoir 22. Thence it passes through the heated coil 26, is heated therein to desired degree and is then forced into cylinder 11 round plant 10 infested with the boll weevil. Initially valve 33 is open and valve 31 closed whereby heated gas may circulate freely round plant 10 until an even temperature is arrived at as indicated on thermometer 35. Thereafter, valve 33 is closed and the heated gas is supplied to the interior of container 11 until a predetermined pressure is reached, as indicated by gage 34.

After the application for a desired period of the heated gases under pressure, the gases may be released by suddenly opening valve 31, whereby a sudden change in pressure occurs within cylinder 11. The temperature of the gases should be such as will be fatal to the insect in various stages of development, but not injurious to the plant 10, and preferably this temperature should not exceed 150° F. Likewise the pressure should be applied to the same end and both temperatures and pressures will vary with the insect to be dealt with and the plant.

The effect of pressure is to quickly force the heated gases into all orifices made by the insects wherein they, or their stages, are and into contact therewith so that a comparatively short treatment will be effective. Also, the application of pressure and the sudden relief thereof has a decidedly dangerous physiological action on the insect.

Alternatively, after heated gases have been applied under pressure and the pressure relieved as described, valve 31 may be quickly closed, pipe 20 connected to the inlet 18 and heater 28 shut off. Then engine 14 may be reversed making pump 17 an exhausting pump whereby a pressure on the absolute scale below 14.7# per square inch, or below atmospheric pressure, may be obtained in cylinder 11. After maintaining this pressure for a predetermined period, valve 31 may again be suddenly opened to restore atmospheric pressure in cylinder 11.

The gases used may be air, carbon monoxide, carbon dioxide, carbon disulphide, hydrocyanic acid or a mixture of any or all of them and such may be supplied in any manner to the inlet pipe 18. Carbon monoxide and carbon dioxide may be drawn from the exhaust 15 or from the furnace 25.

I claim as my invention:

The process of destroying insect life on plants without injuring said plants, which consists in subjecting the insect life on said plants to the action of a gas heated to a temperature not exceeding 150° Fahrenheit under a pressure differing substantially from that of the atmosphere, and then suddenly restoring the pressure to that of the atmosphere.

In testimony whereof I affix my signature.

CHARLES L. STOKES.